United States Patent
Lei et al.

(10) Patent No.: US 8,868,129 B2
(45) Date of Patent: Oct. 21, 2014

(54) ANTENNA DEVICE AND APPLICATION TERMINAL FOR DUAL-MODE INTELLIGENT MOBILE PHONE

(75) Inventors: Bin Lei, Shenzhen (CN); Chenfei Zhao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 77 days.

(21) Appl. No.: 13/643,421

(22) PCT Filed: Aug. 17, 2010

(86) PCT No.: PCT/CN2010/076050
§ 371 (c)(1),
(2), (4) Date: Oct. 25, 2012

(87) PCT Pub. No.: WO2011/137611
PCT Pub. Date: Nov. 10, 2011

(65) Prior Publication Data
US 2013/0053096 A1   Feb. 28, 2013

(30) Foreign Application Priority Data
May 5, 2010   (CN) .......................... 2010 1 0165766

(51) Int. Cl.
*H04W 88/06*   (2009.01)
*H01Q 21/28*   (2006.01)
*H01Q 1/24*    (2006.01)
*H04W 28/04*   (2009.01)
*H04W 64/00*   (2009.01)
*H01Q 5/00*    (2006.01)
*H04W 84/18*   (2009.01)
*G01S 19/36*   (2010.01)

(52) U.S. Cl.
CPC ............... *H01Q 21/28* (2013.01); *H01Q 1/243* (2013.01); *H04W 28/04* (2013.01); *H04W 64/00* (2013.01); *H01Q 5/00* (2013.01); *H04W 84/18* (2013.01); *G01S 19/36* (2013.01)
USPC ..................... 455/552.1; 455/553.1

(58) Field of Classification Search
CPC ..................................................... H04W 88/06
USPC ........ 455/129, 269, 272, 278.1, 279.1, 552.1, 455/553.1, 554.2, 575.1; 370/338
See application file for complete search history.

(56) References Cited

U.S. PATENT DOCUMENTS

2005/0041624 A1* 2/2005 Hui et al. ....................... 370/335
2006/0214857 A1  9/2006 Ollikainen
(Continued)

FOREIGN PATENT DOCUMENTS

CN   101330691 A   12/2008
CN   201234356 Y   5/2009
(Continued)

*Primary Examiner* — Jinsong Hu
*Assistant Examiner* — Erica Navar
(74) *Attorney, Agent, or Firm* — Panitch Schwarze Belisario & Nadel LLP

(57) ABSTRACT

The present invention provides an antenna device for a dual-mode intelligent mobile phone, which comprises: a Code Division Multiple Access 2000 1× Evolution-data Optimized (CDMA 20001× EV-DO) antenna (101), a Global System for Mobile Communications (GSM) antenna (102), a Wireless Fidelity/Bluetooth/Global Position System (WIFI/BT/GPS) antenna (103) and a WIFI/GPS dual-frequency device (104). The present invention further provides an application terminal for a dual-mode intelligent mobile phone. By using the device and the terminal provided by present invention, multiple antennas can be disposed in the narrow space of a mobile phone and the interference among the antennas can be reduced.

8 Claims, 3 Drawing Sheets

(56) References Cited

U.S. PATENT DOCUMENTS

| | | |
|---|---|---|
| 2007/0200773 A1 | 8/2007 | Dou et al. |
| 2008/0055163 A1 | 3/2008 | Man et al. |
| 2008/0227408 A1* | 9/2008 | Hsiao et al. ............... 455/77 |
| 2009/0096683 A1 | 4/2009 | Rosenblatt et al. |
| 2011/0014958 A1* | 1/2011 | Black et al. ............... 455/575.7 |

FOREIGN PATENT DOCUMENTS

| | | |
|---|---|---|
| CN | 101557237 A | 10/2009 |
| WO | 2009095815 A2 | 8/2009 |

* cited by examiner

ANTENNA DEVICE AND APPLICATION TERMINAL FOR DUAL-MODE INTELLIGENT MOBILE PHONE

CROSS-REFERENCE TO RELATED APPLICATION

This application is a Section 371 of International Application No. PCT/CN2010/076050, filed Aug. 17, 2010, which was published in the English language on Oct. 11, 2011, under International Publication No. WO 2011/137611 A1 the disclosure of which is incorporated herein by reference.

FIELD OF THE INVENTION

The present invention relates to the field of the assembly of terminal antennas, and in particular to an antenna device and an application terminal for a dual-mode intelligent mobile phone.

BACKGROUND OF THE INVENTION

With the development of mobile communication, the First Generation (1G) mobile communication terminal, which can only provide a voice communication function, is being phased out. In addition to the voice communication function, the high-security Second Generation (2G) mobile communication terminal also provides other additional functions and basic data communication functions. Technical standards for 2G mainly comprise European Global System for Mobile Communications (GSM) and American Code Division Multiple Access (CDMA). Apart from providing the voice communication function, the Third Generation (3G) mobile communication terminal is outstanding for its broadband wireless data communication function. The following three technical standards for 3G are currently acknowledged by the Third Generation Partnership Project (3GPP) and the 3GPP2L: European Wideband Code Division Multiple Access (WCDMA), American Code Division Multiple Access 2000 1× Evolution-Data Optimized (EV-DO) and Chinese Time Division-Synchronous Code Division Multiple Access (TD-SCDMA).

With the popularization of 3G network, corresponding dual-mode intelligent mobile phones are gradually developed by manufacturers for 3G networks. As the application of 3G focuses mainly on broadband wireless data communication, the developed dual-mode intelligent mobile phones are required to have a capability of accessing the Internet wirelessly, wherein one of the important access modes is Wireless Fidelity (WIFI). In addition, an intelligent mobile phone is typically provided with a Global Position System (GPS) and a Bluetooth (BT) interface to guarantee the convenience of wireless communication.

It can be seen that multiple wireless communication units should be integrated in a dual-mode intelligent mobile phone, and each communication unit needs an antenna for a corresponding frequency band. Therefore, it becomes an urgent problem to be solved how to dispose multiple antennas in the narrow space of a mobile phone and reduce the interference among the antennas of the communication units.

SUMMARY OF THE INVENTION

In view of this, the present invention provides an antenna device and an application terminal for a dual-mode intelligent mobile phone to dispose multiple antennas in the narrow space of the mobile phone and reduce the interference among the antennas.

The technical scheme of the present invention is realized as follows.

An antenna device for a dual-mode intelligent mobile phone is provided, which comprises: a Code Division Multiple Access 2000 1× Evolution-data Optimized (EV-DO) antenna, a Global System for Mobile Communications (GSM) antenna, a Wireless Fidelity/Bluetooth/Global Position System (WIFI/BT/GPS) antenna and a WIFI/GPS dual-frequency device, wherein the EV-DO antenna is connected with a mainboard of a mobile phone, is arranged on a short side of the mainboard of the mobile phone, and is configured to receive or send a signal supportive to an EV-DO frequency band;

the GSM antenna is connected with the mainboard of the mobile phone, is arranged on another short side of the mainboard of the mobile phone, and is configured to receive or send a signal supportive to a GSM frequency band;

the WIFI/BT/GPS antenna is connected with the WIFI/GPS dual-frequency device, and is configured to receive or send signals supportive to frequency bands used in WIFI, BT and GPS connection modes; and the WIFI/GPS dual-frequency device, a GPS interface of which is directly connected with the mainboard of the mobile phone, and a WIFI/BT interface of which is connected with the mainboard of the mobile phone via a switch, is configured to separate a signal used in the WIFI or BT mode from a signal used in the GPS mode and inhibit the signal used in the WIFI or BT mode from entering a receiving channel used in the GPS mode, wherein the GPS interface and the WIFI/BT interface are both arranged on a long side of the mainboard of the mobile phone.

In the antenna device, a distance between the GSM antenna and the EV-DO antenna is above 105 mm.

the EV-DO antenna is a built-in planar inverted-F antenna or a monopole CELL/Personal Communication Service (PCS) antenna; and the GSM antenna and the WIFI/BT/GPS antenna are built-in planar inverted-F antennas or monopole CELL/PCS antennas.

In the antenna device, t processing modules corresponding to network modes of antennas comprises:

an EV-DO processing module arranged on the mainboard of the mobile phone and connected with the EV-DO antenna; a GSM processing module arranged on the mainboard of the mobile phone and connected with the GSM antenna; and a WIFI processing module, a BT processing module and a GPS processing module arranged on the mainboard of the mobile phone and connected with the WIFI/GPS dual-frequency device.

In the antenna device, the WIFI/GPS dual-frequency device is connected with the WIFI processing module, the BT processing module and the GPS processing module in the ways as follows:

the GPS interface of the WIFI/GPS dual-frequency device is directly connected with the GPS processing module, and the WIFI/BT interface of the WIFI/GPS dual-frequency device is connected with the WIFI processing module or the BT processing module through a switching of the switch.

An application terminal for a dual-mode intelligent mobile phone is also provided, which comprises: a mobile phone shell and an antenna device, wherein the antenna device comprises: an Code Division Multiple Access 2000 1× Evolution-data Optimized (EV-DO) antenna, a Global System for Mobile Communications (GSM) antenna, a Wireless Fidelity/Bluetooth/Global Position System (WIFI/BT/GPS) antenna, a WIFI/GPS dual-frequency device and a mainboard of a mobile phone, wherein the EV-DO antenna is connected with the mainboard of the mobile phone, is arranged on a short side of the mainboard of the mobile phone, and is configured to receive or send a signal supportive to an EV-DO frequency band;

the GSM antenna is connected with the mainboard of the mobile phone, is arranged on another short side of the mainboard of the mobile phone, and is configured to receive or send a signal supportive to a GSM frequency band;

the WIFI/BT/GPS antenna is connected with the WIFI/GPS dual-frequency device, and is configured to receive or send signals supportive to frequency bands used in WIFI, BT and GPS connection modes; and the WIFI/GPS dual-frequency device, a GPS interface of which is directly connected with the mainboard of the mobile phone, and a WIFI/BT interface of which is connected with the mainboard of the mobile phone via a switch, is configured to separate a signal used in the WIFI or BT mode from a signal used in the GPS mode and inhibit the signal used in the WIFI or BT mode from entering a receiving channel used in the GPS mode, wherein the GPS interface and the WIFI/BT interface are both arranged on a long side of the mainboard of the mobile phone.

In the application terminal, the EV-DO antenna, the GSM antenna and the WIFI/BT/GPS antenna are arranged in a mobile phone shell in the ways as follows:

the WIFI/BT/GPS antenna is arranged on one of the two closer ends of the mobile phone shell and is connected with the mainboard of the mobile phone through the WIFI/GPS dual-frequency device; and the EV-DO antenna and the GSM antenna are respectively arranged on two farther ends of the mobile phone shell and spaced from each other by at least 105 mm, wherein the EV-DO antenna is correspondingly leaned in position towards an opposite side of a side on which the WIFI/BT/GPS antenna is arranged and is connected with the mainboard of the mobile phone.

In the application terminal, the EV-DO antenna is a built-in planar inverted-F antenna or a monopole CELL/Personal Communication Service (PCS) antenna; and the GSM antenna and the WIFI/BT/GPS antenna are built-in planar inverted-F antennas or monopole CELL/PCS antennas.

In the application terminal, the WIFI/GPS dual-frequency device, the EV-DO antenna and the GSM antenna are connected with the mainboard of the mobile phone in the ways as follows:

the EV-DO antenna is connected with an EV-DO processing module arranged on the mainboard of the mobile phone; the GSM antenna is connected with a GSM processing module arranged on the mainboard of the mobile phone; and the WIFI/GPS dual-frequency device is connected with a WIFI processing module, a BT processing module and a GPS processing module arranged on the mainboard of the mobile phone.

In the antenna device, the WIFI/GPS dual-frequency device is connected with the WIFI processing module, the BT processing module and the GPS processing module in the ways as follows:

the GPS interface of the WIFI/GPS dual-frequency device is directly connected with the GPS processing module, and the WIFI/BT interface of the WIFI/GPS dual-frequency device is connected with the WIFI processing module or the BT processing module through a switching of the switch.

By keeping the distance between the EV-DO antenna and the GSM antenna above 105 mm and using the WIFI/BT/GPS antenna with the GSM antenna, the antenna device and the application terminal provided herein for a dual-mode intelligent mobile phone realize the dispose of multiple antennas supportive to EV-DO, GSM, WIFI, BT and GPS functions in the narrow space of the mobile phone and reduce the interference among the antennas.

DETAILED DESCRIPTION OF EMBODIMENTS

The technical scheme of the present invention is described below in detail with reference to the drawings and in conjunction with embodiments.

Figure 1:
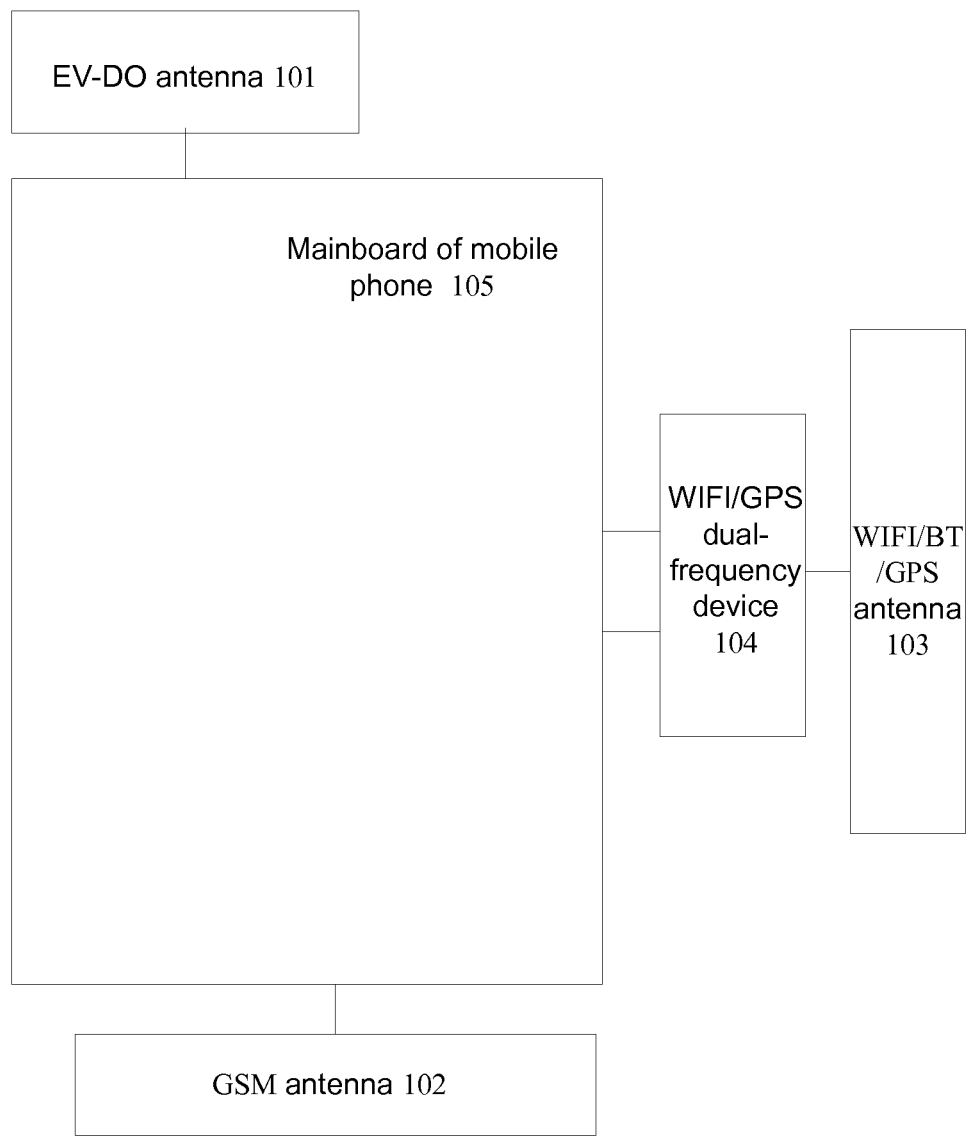
FIG. 1 is a schematic structural diagram of an antenna device for a dual-mode intelligent mobile phone according to the embodiment of the present invention.

FIG. 1 is a schematic structural diagram of an antenna device for a dual-mode intelligent mobile phone according to the embodiment of the present invention, and as shown in FIG. 1, the antenna device comprises: an EV-DO antenna 101, a GSM antenna 102, a WIFI/BT/GPS antenna 103 and a WIFI/GPS dual-frequency device 104, wherein the EV-DO antenna 101, connected with a mainboard of a mobile phone 105 and arranged on a short side of the mainboard of the mobile phone 105, is configured to receive or send a signal supportive to an EV-DO frequency band.

Specifically, the EV-DO antenna 101 may be a built-in planar inverted-F antenna or a monopole CELL/PCS antenna. The signal supportive to the EV-DO frequency band refers to CELL 850 signal in 850 MHz frequency band and PCS1900 signal in 1900 MHz frequency band, wherein PCS refers to Personal Communication System.

The GSM antenna 102, connected with the mainboard of the mobile phone 105 and arranged on another short side of the mainboard of the mobile phone 105, is configured to receive or send a signal supportive to a GSM frequency band.

Specifically, the GSM antenna 102 may be a built-in planar inverted-F antenna or a monopole CELL/Personal Communication Service (PCS) antenna. The signal supportive to the GSM frequency band refers to GSM850 signal in 850 MHz frequency band, GSM900 signal in 900 MHz frequency band, GSM1800 signal in 1800 MHz frequency band and GSM1900 signal in 1900 MHz frequency band. Theoretically, the space distance between the EV-DO antenna 101 and the GSM antenna 102 should be kept as far as possible so as to increase the space isolation of the above two antennas and reduce the crosstalk of signals. According to practical and theoretical analyses, the distance between the above two antennas should be at least above 105 mm so as to guarantee an isolation of 20 dB when the two antennas are common-ground.

The WIFI/BT/GPS antenna 103, connected with the WIFI/GPS dual-frequency device 104, is configured to receive or send signals supportive to the frequency bands used in WIFI, BT and GPS connection modes.

Specifically, the WIFI/GPS antenna 103 may be a built-in planar inverted-F antenna or a monopole CELL/PCS antenna. The signal supportive to the frequency bands used in WIFI, BT and GPS connection modes refers to WIFI and BT signals in 2.4 GHz frequency band and GPS1500 signal in 1575.42 MHz frequency band.

The WIFI/GPS dual-frequency device 104 is directly connected with the mainboard of the mobile phone 105 via a GPS interface and arranged on a long side of the mainboard of the mobile phone 105. The WIFI/GPS dual-frequency device 104 has a WIFI/BT interface and the GPS interface, wherein the WIFI/BT interface is connected with the long side of the mainboard of the mobile phone 105 via a switch, and the GPS interface is directly connected with the long side of the mainboard of the mobile phone 105. The WIFI/GPS dual-frequency device 104 is configured to separate a signal used in the WIFI or BT mode from a signal used in the GPS mode and inhibit the signal used in the WIFI or BT mode from entering a receiving channel used in the GPS mode.

Specifically, as the signal used in the WIFI or BT mode is inhibited from entering a receiving channel used in the GPS mode, the amplifier of the receiving channel used in the GPS mode is prevented from entering into a saturated blocking state. Due to the use of the WIFI/GPS dual-frequency device 104, the signal used in the WIFI or BT mode and the signal used in the GPS mode will be enhanced in attenuation by about 0.6 dB and kept in performance in an acceptable range.

The antenna device shown in FIG. 1 further comprises the mainboard of the mobile phone 105, which is connected with the EV-DO antenna 101, the GSM antenna 102 and the WIFI/GPS dual-frequency device 104 via the processing modules corresponding to the network modes of the antennas and processes the signals received or sent by the antennas by the processing modules.

Specifically, the EV-DO antenna 101 is correspondingly connected with the EV-DO processing module arranged on the mainboard of the mobile phone 105; the GSM antenna 102 is connected with the GSM processing module arranged on the mainboard of the mobile phone 105; and the WIFI/GPS dual-frequency device 104 is connected with the WIFI processing module, the BT processing module and the GPS processing module arranged on the mainboard of the mobile phone 105. Wherein, the WIFI/GPS dual-frequency device 104 has two interfaces: the GPS interface that is directly connected with the GPS processing module, and the WIFI/BT interface that is connected with the WIFI processing module or the BT processing module via the switching of the switch to realize the time-sharing working of the WIFI processing module and the BT processing module.

Figure 2:
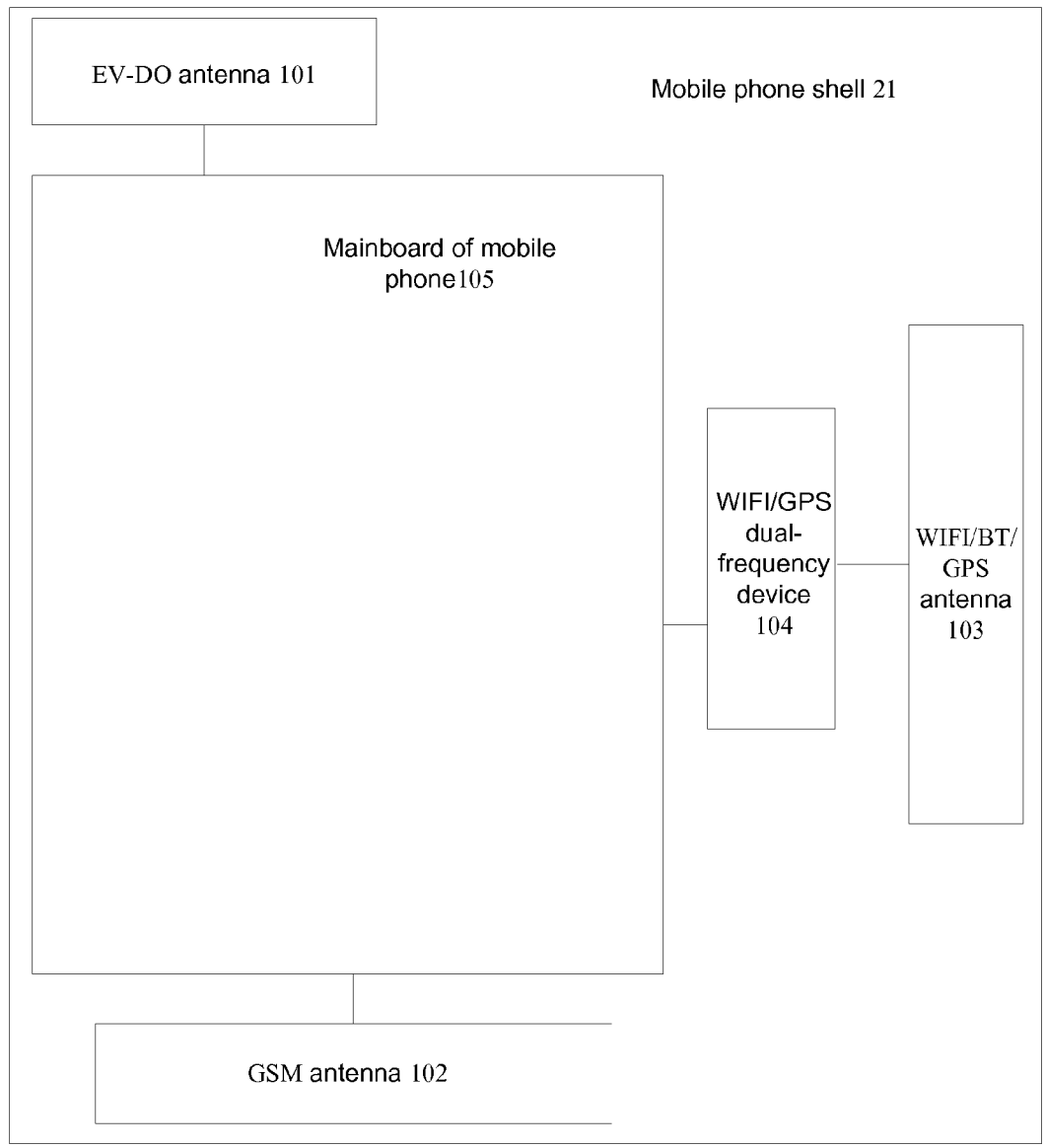
FIG. 2 is a schematic structural diagram of an application terminal for a dual-mode intelligent mobile phone according to the embodiment of the present invention.

FIG. 2 is a schematic structural diagram of an application terminal for a dual-mode intelligent mobile phone according to the embodiment of the present invention, and as shown in FIG. 2, the terminal comprises: a mobile phone shell 21, the EV-DO antenna 101, the GSM antenna 102, the WIFI/BT/GPS antenna 103, the WIFI/GPS dual-frequency device 104 and the mainboard of the mobile phone 105, wherein the mobile phone shell 21 is rectangular. In order to guarantee the distance between the EV-DO antenna 101 and the GSM antenna 102 as far as possible, in the mobile phone shell 21, the two antennas are arranged on two farther ends and are respectively connected with the mainboard of the mobile phone 105, and typically, the two antennas are arranged on the top end and the bottom end for a bar phone.

The distance between the two antennas is at least above 105 mm. The WIFI/BT/GPS antenna 103 is arranged on one side of the two closer ends of the mobile phone shell 21 and is connected with the mainboard of the mobile phone 105 via the WIFI/GPS dual-frequency device 104. Further, the EV-DO antenna 101 is correspondingly leaned in position towards the side opposite to the one on which the WIFI/BT/GPS antenna 103 is arranged so as to reduce the signal interference between the EV-DO antenna 101 and the WIFI/BT/GPS antenna 103.

Figure 3:
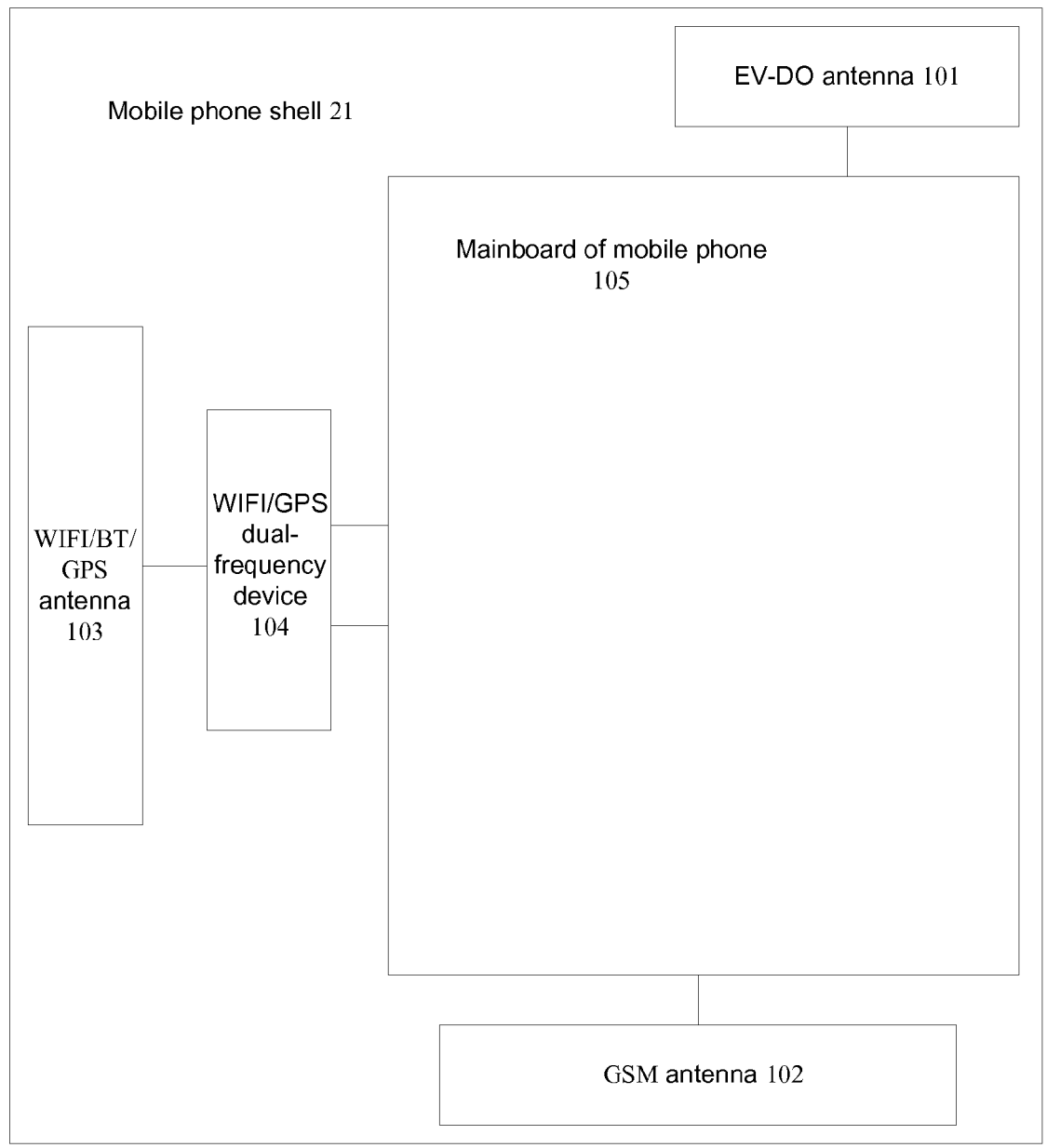
FIG. 3 is a schematic structural diagram of another application terminal for a dual-mode intelligent mobile phone according to the embodiment of the present invention.

Specifically, as shown in FIG. 2, the WIFI/BT/GPS antenna 103 is arranged on the right of the mobile phone shell 21, and correspondingly, the EV-DO antenna 101 is arranged at a leftward position on the top of the mobile phone shell 21. FIG. 3 is a schematic structural diagram of another application terminal for a dual-mode intelligent mobile phone according to the embodiment of the present invention, and as shown in FIG. 3, when the WIFI/BT/GPS antenna 103 is arranged on the left of the mobile phone shell 21, the EV-DO antenna 101 is correspondingly arranged at a rightward position on the top of the mobile phone housing 21.

The WIFI/GPS dual-frequency device 104 is arranged to separate the signal used in the WIFI or BT mode from the signal used in the GPS mode and inhibit the signal used in the WIFI or BT mode from entering the receiving channel used in the GPS mode. Specifically, the WIFI/GPS dual-frequency device 104 has two interfaces: the GPS interface that is directly connected with the GPS processing module arranged on the mainboard of the mobile phone 105, and the WIFI/BT interface that is connected with the WIFI processing module or the BT processing module arranged on the mainboard of the mobile phone 105 through the switching of the switch so as to realize the time-sharing working of the WIFI processing module and the BT processing module.

The mainboard of the mobile phone 105 is connected with the EV-DO antenna 101, the GSM antenna 102 and the WIFI/GPS dual-frequency device 104 via the processing modules corresponding to the network modes of the antennas and processes the signals received or sent by the antennas via the processing module.

Specifically, the EV-DO antenna 101 is correspondingly connected with the EV-DO processing module arranged on the mainboard of the mobile phone 105; an the GSM antenna 102 is connected with the GSM processing module arranged on the mainboard of the mobile phone 105; and the WIFI/GPS dual-frequency device 104 is connected with the WIFI processing module, the BT processing module and the GPS processing module arranged on the mainboard of the mobile phone 105. Wherein, the WIFI/GPS dual-frequency device 104 has two interfaces: the GPS interface that is directly connected with the GPS processing module, and the WIFI/BT interface that is connected with the WIFI processing module or the BT processing module through the switching of the switch so as to realize the time-sharing working of the WIFI processing module and the BT processing module.

The descriptions above are only preferable embodiments of the present invention but not used to restrict the protection scope of the present invention. All the modifications, equivalents and improvements devised without departing from the spirit and scope of the present invention belong to the protection scope of the present invention.

What is claimed is:

1. An antenna device for a dual-mode intelligent mobile phone, comprising: a Code Division Multiple Access 2000 1× Evolution-data Optimized (EV-DO) antenna, a Global System for Mobile Communications (GSM) antenna, a Wireless Fidelity/Bluetooth/Global Position System (WIFI/BT/GPS) antenna and a WIFI/GPS dual-frequency device, wherein the EV-DO antenna is connected with a mainboard of a mobile phone, is arranged on a short side of the mainboard of the mobile phone, and is configured to receive or send a signal supportive to an EV-DO frequency band;

the GSM antenna is connected with the mainboard of the mobile phone, is arranged on another short side of the mainboard of the mobile phone, and is configured to receive or send a signal supportive to a GSM frequency band;

the WIFI/BT/GPS antenna is connected with the WIFI/GPS dual-frequency device, and is configured to receive or send signals supportive to frequency bands used in WIFI, BT and GPS connection modes;

the WIFI/GPS dual-frequency device, a GPS interface of which is directly connected with the mainboard of the mobile phone, and a WIFI/BT interface of which is connected with the mainboard of the mobile phone via a switch, is configured to separate a signal used in the WIFI or BT mode from a signal used in the GPS mode and inhibit the signal used in the WIFI or BT mode from entering a receiving channel used in the GPS mode, wherein the GPS interface and the WIFI/BT interface are both arranged on a long side of the mainboard of the mobile phone; and an EV-DO processing module arranged on the mainboard of the mobile phone and connected with the EV-DO antenna; a GSM processing module arranged on the mainboard of the mobile phone and connected with the GSM antenna; and a WIFI processing module, a BT processing module and a GPS processing module arranged on the mainboard of the mobile phone and connected with the WIFI/GPS dual-frequency device, wherein the GPS interface of the WIFI/GPS dual-frequency device is directly connected with the GPS processing module, and the WIFI/BT interface of the WIFI/GPS dual-frequency device is connected with the WIFI processing module or the BT processing module through a switching of the switch.

2. The device according to claim 1, wherein a distance between the GSM antenna and the EV-DO antenna is above 105 mm.

3. The device according to claim 1, wherein the EV-DO antenna is a built-in planar inverted-F antenna or a monopole CELL/ Personal Communication Service (PCS) antenna; and
the GSM antenna and the WIFI/BT/GPS antenna are built-in planar inverted-F antennas or monopole CELL/PCS antennas.

4. An application terminal for a dual-mode intelligent mobile phone, comprising: a mobile phone shell and an antenna device, wherein the antenna device comprises: an Code Division Multiple Access 2000 1×Evolution-data Optimized (EV-DO) antenna, a Global System for Mobile Communications (GSM) antenna, a Wireless Fidelity/Bluetooth/Global Position System (WIFI/BT/GPS) antenna, a WIFI/GPS dual-frequency device and a mainboard of a mobile phone, wherein the EV-DO antenna is connected with the mainboard of the mobile phone, is arranged on a short side of the mainboard of the mobile phone, and is configured to receive, or send a signal supportive to an EV-DO frequency band;

the GSM antenna is connected with the mainboard of the mobile phone, is arranged on another short side of the mainboard of the mobile phone, and is configured to receive or send a signal supportive to a GSM frequency band;

the WIFI/BT/GPS antenna is connected with the WIFI/GPS dual-frequency device, and is configured to receive or send signals supportive to frequency bands used in WIFI, BT and GPS connection modes;

the WIFI/GPS dual-frequency device, a GPS interface of which is directly connected with the mainboard of the mobile phone, and a WIFI/BT interface of which is connected with the mainboard of the mobile phone via a switch, is configured to separate a signal used in the WIFI or BT mode from a signal used in the GPS mode and inhibit the signal used in the WIFI or BT mode from entering a receiving channel used in the GPS mode, wherein the GPS interface and the WIFI/BT interface are both arranged on a long side of the mainboard of the mobile phone; and an EV-DO processing module arranged on the mainboard of the mobile phone and connected with the EV-DO antenna; a GSM processing module arranged on the mainboard of the mobile phone and connected with the GSM antenna; and a WIFI processing module, a BT processing module and a GPS processing module arranged on the mainboard of the mobile phone and connected with the WIFI/GPS dual-frequency device, wherein the GPS interface of the WIFI/GPS dual-frequency device is directly connected with the GPS processing module, and the WIFI/BT interface of the WIFI/GPS dual-frequency device is connected with the WIFI processing module or the BT processing module through a switching of the switch.

5. The terminal according to claim 4, wherein the EV-DO antenna, the GSM antenna and the WIFI/BT/GPS antenna are arranged in the mobile phone shell as follows:

the WIFI/BT/GPS antenna is arranged on one short side of the mobile phone shell and is connected with the mainboard of the mobile phone through the WIFI/GPS dual-frequency device; and the EV-DO antenna and the GSM antenna are respectively arranged on two long sides of the mobile phone shell and spaced from each other by at least 105 mm, wherein the EV-DO antenna is close to an opposite side of a side on which the WIFI/BT/GPS antenna is arranged and is connected with the mainboard of the mobile phone.

6. The terminal according to claim 4, wherein the EV-DO antenna is a built-in planar inverted-F antenna or a monopole CELL/ Personal Communication Service (PCS) antenna; and
the GSM antenna and the WIFI/BT/GPS antenna are built-in planar inverted-F antennas or monopole CELL/PCS antennas.

7. The device according to claim 2, wherein the EV-DO antenna is a built-in planar inverted-F antenna or a monopole CELL/ Personal Communication Service (PCS) antenna; and
the GSM antenna and the WIFI/BT/GPS antenna are built-in planar inverted-F antennas or monopole CELL/PCS antennas.

8. The terminal according to claim 5, wherein the EV-DO antenna is a built-in planar inverted-F antenna or a monopole CELL/Personal Communication Service (PCS) antenna; and the GSM antenna and the WIFI/BT/GPS antenna are built-in planar inverted-F antennas or monopole CELL/PCS antennas.

* * * * *